(No Model.)
G. A. WEYLAND & L. ROEDER.
SIDE BAR VEHICLE.
No. 302,613. Patented July 29, 1884.
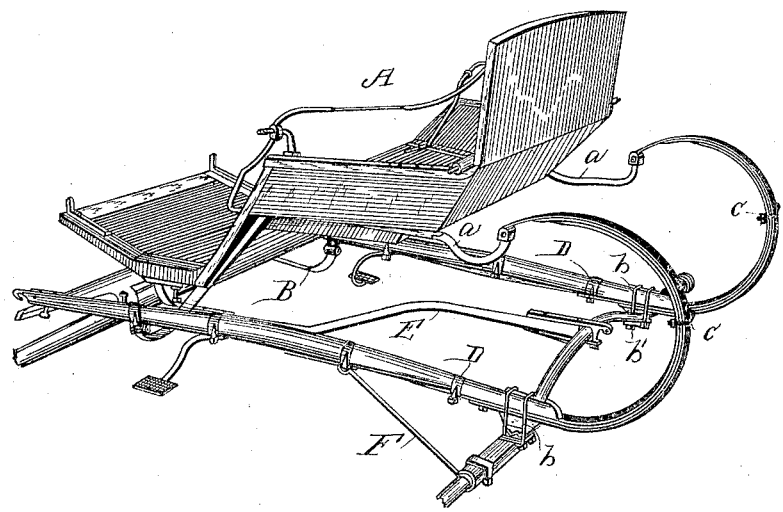
WITNESSES:
W. E. Bowen
O. M. Rheem
INVENTORS
Geo. A. Weyland & Louis Roeder.
BY Frank Sheely.
ATTORNEY

United States Patent Office.

GEORGE A. WEYLAND AND LOUIS ROEDER, OF BOONVILLE, MISSOURI.

SIDE-BAR VEHICLE.

SPECIFICATION forming part of Letters Patent No. 302,613, dated July 29, 1884.

Application filed February 15, 1884. (No model.)

*To all whom it may concern:*

Be it known that we, GEORGE A. WEYLAND and LOUIS ROEDER, citizens of the United States, residing at Boonville, in the county of Cooper and State of Missouri, have invented certain new and useful Improvements in Vehicles, of which the following is a specification, reference being had therein to the accompanying drawing.

This invention has relation to improvements in that class of vehicles known as "side-bar vehicles;" and it consists in the peculiar construction, arrangement, and combination of devices, as will be hereinafter more fully set forth, and particularly pointed out in the claim appended.

In the accompanying drawing, to which reference is made, the figure represents a perspective of a buggy, showing my improvements applied.

Referring by letter to the said drawing, A indicates the body of a buggy, which may be of any suitable shape or form. This body is provided at its rear under side with rearwardly-extending arms $a\ a$, which are bifurcated at their outer ends, and the arms of the bifurcations perforated to receive transverse bolts for connecting the upper ends of the C-springs. The forward portion of the body is supported upon the side bars by means of a transverse curved spring, B, the opposite ends of which are clipped to the respective side bars, as shown. The C-springs have their lower ends interposed between the rear axle and the side bars, and are secured thereto by means of the saddle-clips $b$, having clip-plates $b'$.

D D are clips, which are employed as an additional means for securing the said springs to the side bars.

E indicates a reach, which is secured at its opposite ends to the front and rear axles, respectively, as will be hereinafter more fully explained.

The C-springs are provided with loops $c$, as shown, by means of which ornamental straps may be attached thereto.

It will be perceived that by the employment of the reach in the construction set forth undue strain upon the saddle-clips securing the side bars and C-springs to the rear axle will be prevented.

F indicates a brace-rod, one being secured to each respective side bar, and their opposite ends connected to the rear axle near their thimble-shoulders, which, in connection with the reach, effectually prevents any strain upon the saddle-clips holding the C-springs, as before described.

By the employment of the front cross-springs in connecting with the rear C-springs we are enabled to hang the body much lower than if side springs or the ordinary elliptical springs were used in front, and by the employment of the reach in this construction a durable bracing is given to the axles.

We are aware that it is not new to support the rear of a buggy-body on C-springs, said springs being connected at their upper ends by means of clips to rearwardly-extending arms, and their lower ends clipped upon the upper surface of the side bars, and therefore do not claim such construction, broadly; but

What we claim as new, and desire to secure by Letters Patent, is—

The combination, with the body A of a vehicle, and the rearwardly-extending bifurcated arms $a$, of the curved connecting-springs C, interposed between the side bars and the rear axle, and secured by means of saddle-clips $b$, the transverse curved spring B, clipped to the side bars, and the reach connecting the front and rear axles, substantially as and for the purposes specified.

In testimony whereof we affix our signatures in presence of two witnesses.

GEORGE A. WEYLAND.
LOUIS ROEDER.

Witnesses:
GEORGE ROEDER,
HUGO E. MILLER.